US006478123B2

(12) United States Patent
Seggebruch et al.

(10) Patent No.: US 6,478,123 B2
(45) Date of Patent: Nov. 12, 2002

(54) HYDRAULIC ELEVATOR WITH PLUNGER BRAKES

(75) Inventors: Ernie Glen Seggebruch, Geneseo, IL (US); Andrew Ernest Werner, Davenport, IA (US)

(73) Assignee: Kone Inc., Moline, IL (US)

( * ) Notice: Subject to any disclaimer, the term of this patent is extended or adjusted under 35 U.S.C. 154(b) by 0 days.

(21) Appl. No.: 09/769,669

(22) Filed: Jan. 25, 2001

(65) Prior Publication Data

US 2001/0023797 A1 Sep. 27, 2001

Related U.S. Application Data

(62) Division of application No. 09/174,271, filed on Oct. 16, 1998, now Pat. No. 6,179,094.

(60) Provisional application No. 60/082,859, filed on Apr. 24, 1998.

(51) Int. Cl.[7] .......... F16D 65/24

(52) U.S. Cl. .......... 188/170; 188/136; 188/67; 187/372

(58) Field of Search .......... 188/67, 82.8, 136, 188/170, 182, 187, 189, 372; 187/272, 343, 345, 274, 275, 305

(56) References Cited

U.S. PATENT DOCUMENTS

| | | | | |
|---|---|---|---|---|
| 2,499,993 A | | 3/1950 | Gregg | 188/67 |
| 2,808,903 A | * | 10/1957 | Kovac | 188/67 |
| 3,472,535 A | | 10/1969 | Kinley | 188/67 |
| 3,528,343 A | | 9/1970 | Sherwood | |
| 3,575,087 A | * | 4/1971 | Sherwood | 188/67 |
| 3,643,765 A | * | 2/1972 | Hanchen | 188/67 |
| 3,783,976 A | * | 1/1974 | Kerr | 188/67 |
| 3,995,534 A | * | 12/1976 | Rastetter | 188/67 |
| 4,073,217 A | | 2/1978 | Colin | |
| 4,306,339 A | * | 12/1981 | Ward | 188/67 |
| 4,449,615 A | | 5/1984 | Beath | |
| 4,534,269 A | | 8/1985 | Scerbo et al. | |
| 4,601,449 A | | 7/1986 | Sharbaugh | |
| 4,699,355 A | | 10/1987 | Tomlin et al. | |
| 4,715,625 A | * | 12/1987 | Show, Jr. et al. | 188/67 |
| 4,733,602 A | | 3/1988 | Smith et al. | |
| 4,955,467 A | * | 9/1990 | Kallenbach | 188/381 |
| 5,129,817 A | | 7/1992 | Ing et al. | |
| 5,540,135 A | | 7/1996 | Goellner | |
| 5,590,870 A | | 1/1997 | Goellner | |
| 5,653,311 A | | 8/1997 | Heikkinen et al. | |
| 5,810,119 A | | 9/1998 | Koshak | 187/272 |

FOREIGN PATENT DOCUMENTS

| | | | |
|---|---|---|---|
| GB | 321249 | 11/1929 | |
| SU | 1116240 | 9/1984 | 188/377 |
| WO | WO 97/12829 | 4/1997 | |

* cited by examiner

*Primary Examiner*—Jack Lavinder
*Assistant Examiner*—Thomas J. Williams
(74) *Attorney, Agent, or Firm*—Dykema Gossett PLLC

(57) ABSTRACT

A brake for a plunger of a hydraulic elevator is provided which in a preferred embodiment includes a pressure plate, a first brake ring, a wedge plate, a biasing spring and a fluid release actuator. The pressure plate is movable along an axis generally parallel with the axis of the plunger. The first brake ring encircles the plunger and has an inner surface for engagement with the plunger. The first brake ring also has a second surface for force engagement with the pressure plate. The first brake ring additionally has an outer wedge surface. The first wedge plate has a first wedge surface for engagement with the wedge surface of the first brake ring. The spring biases the pressure plate and wedge plate toward one another. The fluid release actuator urges the pressure plate away from the wedge plate. Upon release of the actuator relative movement of the pressure plate towards the first wedge plate causes the brake ring to circumferentially grip the plunger and prevent movement axial of the plunger.

13 Claims, 6 Drawing Sheets

HYDRAULIC ELEVATOR WITH PLUNGER BRAKES

This application is divisional and claims the benefit of U.S. patent application Ser. No. 09/174,271, filed Oct. 16, 1998, now U.S. Pat. No. 6,179,094 which claims the benefit of U.S. Provisional Application Ser. No. 60/082,859 filed Apr. 24, 1998.

BACKGROUND OF THE INVENTION

The field of the present invention is that of hydraulic elevators. More particularly, the field of the present invention is that of a hydraulic elevator with a brake and a method of utilization thereof.

Elevators come in two main types. One type is a cable elevator wherein an electric motor is rotatively connected with a drum. The drum has a traction cable wrapped over the drum. One end of the cable is attached to an elevator car. The other end of the cable is attached to a counterweight. The elevator car and counterweight are moved up and down opposite one another by rotation of the drum. A cable elevator requires a structural support which can hold the electric motor and drum on top of a building structure. The physical structure required for an elevator shaft and for the support of the elevator motor and drum makes a significant contribution to the cost of a cable elevator. In building structures of six stories or less, it is common to provide a hydraulically actuated elevator. A hydraulic elevator does not require as much structural support of the elevator shaft as a cable elevator requires. Also the hydraulic elevator does not have an overhead motor. In the common type of hydraulic elevator, a powering cylinder is positioned at a subterranean level. Slidably and sealably mounted within the cylinder is a piston often referred to as a plunger. The plunger is sealed by a jack head which is mounted on top of the cylinder. The plunger is made from a hollow piece of steel which has an interior which has been sealed off. The plunger has an exterior wall which is highly polished. To move the elevator car, pressurized fluid is pumped into the cylinder to extend the plunger upwards. To lower the elevator car, pressurized fluid is released from the cylinder. The cylinder must be at least as long as the amount of extension desired for the plunger. In some applications, the length of extension can approach 60 feet. Since many buildings have a basement, the cylinder can sometimes extend 60 feet below an elevator pit which is below a basement floor.

As mentioned previously, in most applications the cylinder extends below the basement floor of the building. Leakage of the cylinder is therefore very hard to detect except by closely monitoring the fluid level in the reservoir of the hydraulic pump which supplies hydraulic oil to the cylinder. The cylinder is subject to pressures in the neighborhood of 50 to 500 pounds force per square inch (psi). A catastrophic failure of a bottom plate of the cylinder can sometimes allow the plunger to descend at a faster rate than desired. To guard against catastrophic failures of the bottom plate, a double bottom cylinder design became the industry standard in 1971. The double bottom cylinder design features a bottom plate plus a bulk head equipped with a relief orifice. The orifice limits the speed of the plunger's descent should a bottom plate catastrophic rupture occur. The double bottom cylinder design is a major improvement. However, many hydraulic cylinders were installed in service before the double bottom cylinder became the industry standard. Therefore, it is desirable to provide a means of restraining downward plunger movement in cases where there is a catastrophic failure of a single bottom cylinder.

Various brakes for the plunger have been brought forth. However, certain technical limitations of prior plunger brakes have discouraged their utilization. Many of the prior art plunger brakes have provided cams or shoes which have been positioned by levers. Actuation of the brake causes the levers to pivot and bring the brake cams or shoes into engagement with the plunger and come to an over center position forcing the brake cams or shoes into the plunger and therefore restraining its motion. As mentioned previously, the plunger is a hollow piece of steel. Often prior plunger brakes inadvertently cause deformation of the plunger. Deformation of the plunger or gouging of its polished cylindrical surface causes major sealing problems. Another problem of many of the prior art plunger brakes is their physical height. The plunger brake must fit between a gland ring (which is on a top end of the jack head) and the bottom of the elevator car when the elevator car is in its lowermost position. In a new installation, the cylinder and jack head can be lowered to provide more room for the plunger brake. However, in attempting to retrofit older hydraulic elevator installations, the option of lowering the hydraulic cylinder and its jack head to make space is not available since the building foundation would have to be torn up and a hole would have to be excavated below the cylinder to allow it to be lowered. Such an effort is often cost prohibitive.

SUMMARY OF THE INVENTION

To overcome the above-noted deficiencies, the hydraulic elevator of the present invention is brought forth. The present invention provides the freedom of a hydraulic elevator with a plunger brake which is extremely effective in braking the plunger while at the same time eliminating or totally eliminating any damage to the plunger due to its application. Additionally, the plunger brake of the present invention can be provided with an extremely low profile allowing it to be added into prior existing hydraulic elevators. The present invention in its preferred embodiment provides a hydraulic elevator with a brake for a plunger of a hydraulic elevator, the brake includes a pressure plate, the pressure plate being movable along an axis generally parallel with an axis of the plunger. A brake ring encircles the plunger. The brake ring has an inner surface for engagement with the plunger and a second surface for contacting the pressure plate. The brake ring also has an outer wedge surface. A wedge plate is also provided. The wedge plate has a first wedge surface engaged with the brake ring wedge surface wherein relative movement of the pressure plate towards the wedge plate causes the brake ring to circumferentially contact the plunger to prevent movement of the plunger along its axis.

It is an object of the present invention to provide a plunger brake that reliably stops a hydraulic elevator plunger when the hydraulic pressure which activates the hydraulic elevator disappears.

It is another object of the present invention to provide a plunger brake for a hydraulic elevator wherein the braking force applied against the plunger is evenly applied against the circumference of the plunger.

The above noted and other objects and features of the present invention will become apparent to those skilled in the art from a review of the following detailed description and drawings.

DETAILED DESCRIPTION OF THE DRAWINGS

Figure 1:
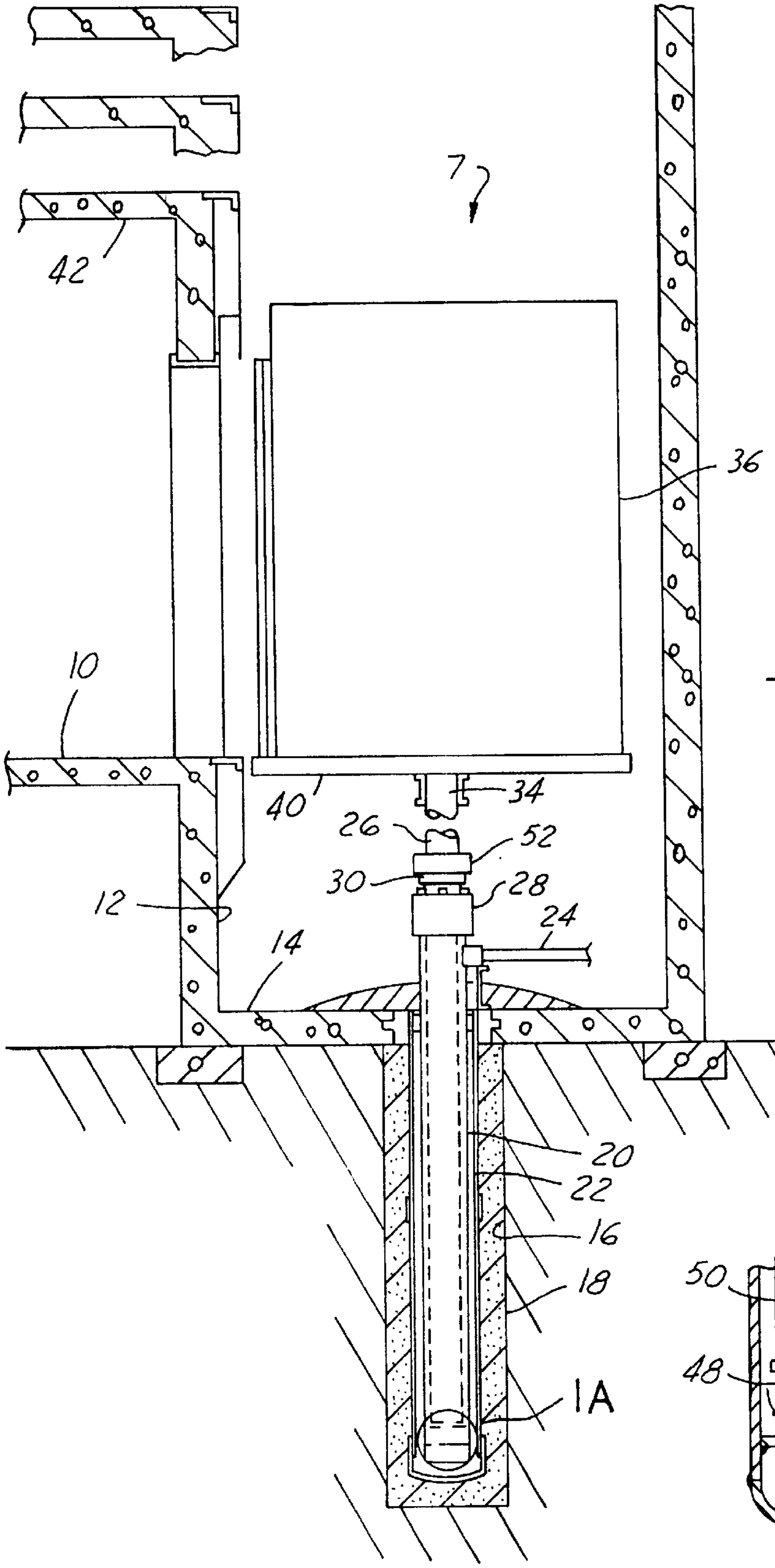
FIG. 1 is an elevational view of a hydraulic elevator of the present invention utilizing a preferred embodiment plunger brake according to the present invention.
Figure 1A:
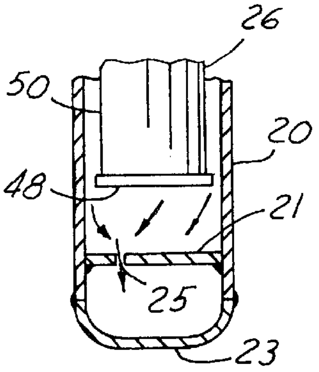
FIG. 1A is an enlarged portion of the hydraulic elevator circled in FIG. 1.

Referring to FIG. 1, the inventive hydraulic elevator 7 of the present invention is shown in its environment of a commercial building. The building has a basement floor 10. The basement floor is penetrated by an elevator pit 12. Elevator pit 12 has a floor 14. Mounted through a hole 16 in the pit floor is a cylinder hole casing 18. The cylinder hole casing 18 has inserted therein a steel cylinder 20. The cylinder 20 is a welded steel pressure vessel which is encased in a PVC casing 22. The cylinder 20 has a bottom plate 23. Above the bottom plate 23 is a bulk head 21 with a relief orifice 25. A hydraulic oil line 24 is used to selectively supply or evacuate pressurized hydraulic fluid to an interior of the cylinder 20. The hydraulic oil line 24 is in fluid communication with a pump (not shown) or a fluid valve as required. Slidably mounted in the cylinder 20 is a plunger 26. The plunger 26 is generally hollow cylindrical steel member having a bottom plate 48 and polished cylindrical side surface 50. Typically, the plunger diameter will be 3½ to 8½ in. The plunger side surface 50 will be polished to a pressure sealable surface condition. The plunger 26 is aligned and sealed within the cylinder 22 by a jack head 28. The jack head 28 has at its top end a gland ring 30 which retains sealing packing about the plunger 26. The extent of extension of the plunger 26 from the cylinder 20 sets the maximum height of the hydraulic elevator 7. A top end 34 of the plunger is operatively connected with an elevator car 36 which has a floor 40 aligned with the basement floor 10. To elevate the elevator to the first floor 42, hydraulic fluid is pumped into the cylinder to extend the plunger outward.

Figure 5:
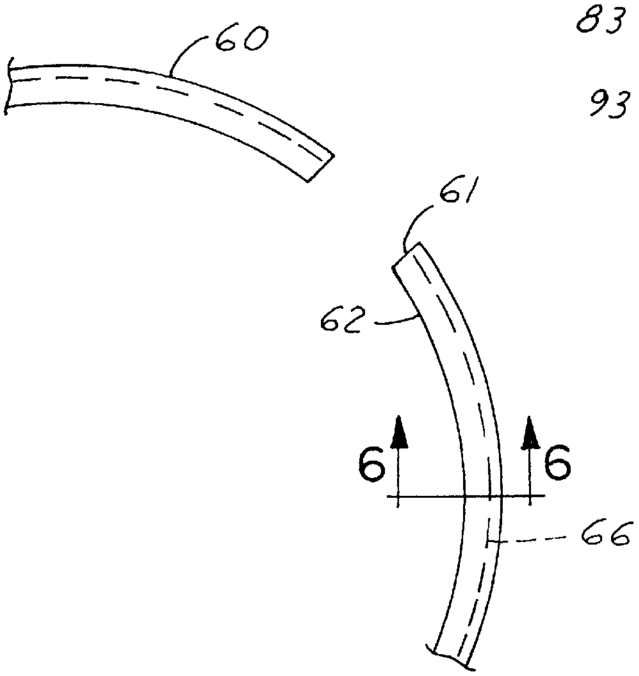
FIG. 5 is a top plan view of the brake ring utilized in the plunger brake shown in FIGS. 2–4.
Figure 6:
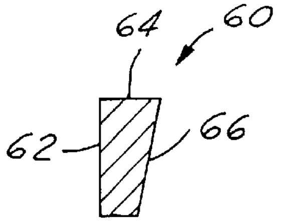
FIG. 6 is a view taken along lines 6—6 of FIG. 5.

Referring additionally to FIGS. 2, 3, 4 and 4A, the hydraulic elevator 7 has an inventive brake 52. The brake 52 has a pressure plate 54. In the environment shown, the pressure plate 54 is a ring. The pressure plate is movable in a direction generally parallel with a translational axis 56 of the plunger. As shown, the pressure plate 54 encircles the plunger 26. The pressure plate has an inner surface 58 having a 1⁄16 in. clearance with the plunger 26. Positioned adjacent to the pressure plate 54 is a first brake ring 60. The brake ring 60 is fabricated from a metal that is softer than the steel of the plunger 26. Typically, the metal will be a brass with a content of 70% copper and 30% zinc (CVA 932). Referring additionally to FIGS. 5 and 6, the first brake ring 60 has an interior annular flat surface 62 for engagement with the side wall 50 of the plunger. The brake ring has a second 64 or top surface for force engagement with the pressure plate 54. As illustrated, the top or first brake ring 60 has direct annular contact with the pressure plate 54. The pressure plate 54 radially overlaps the first brake ring by ¼ inch. The brake ring 60 has a third outer frustal conical wedge surface 66 along its outer surface.

Figure 7:
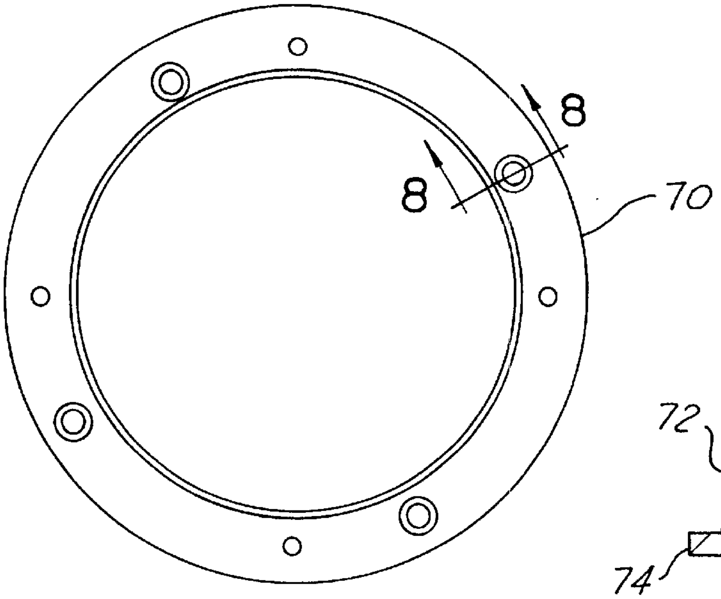
FIG. 7 is a top plan view of the wedge plate shown in FIGS. 2–4.
Figure 8:
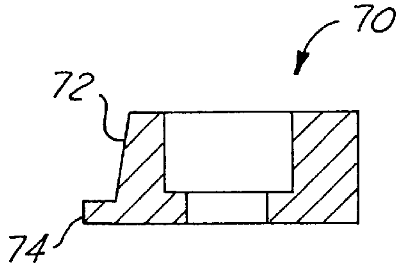
FIG. 8 is a side elevational view of the wedge plate.

A first wedge plate 70 also contacts the first brake ring 60. The first wedge plate is made from a metal that is harder than the brake ring 60, as shown, The first wedge plate is made from steel. Referring additionally to FIGS. 6 and 7, the wedge plate 70 has an inner first conical surface 72 for engagement with the wedge surface 66 of the brake ring. In the embodiment shown in FIGS. 1–7, the wedge plate 70 is a continuous ring. The wedge plate has an interior annular foot 74. The foot of the wedge plate 70 provides the function of a pressure plate 54 on the second lower lock ring 60. In most instances, the second lock ring 60 will be substantially identical to the first lock ring 60. The remaining wedge plates 70 are substantially similar to the afore described wedge plate 70.

Figure 3:
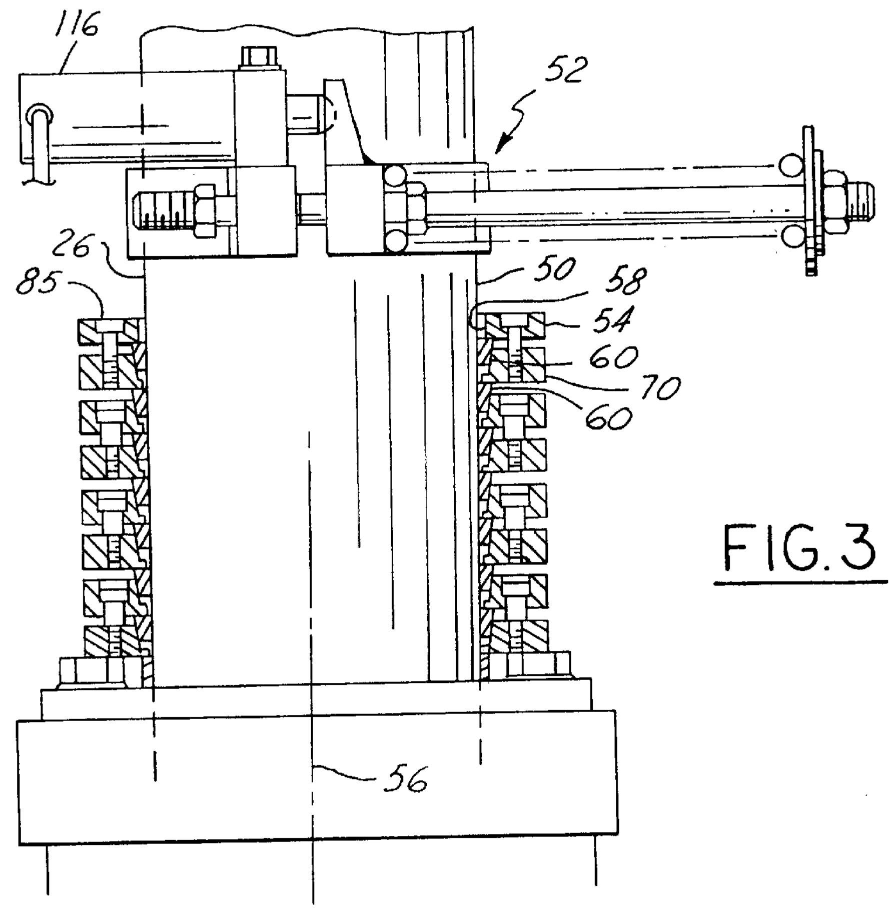
FIG. 3 is a sectional view taken along lines 3—3 of FIG. 2 which illustrates a pressure plate, brake ring and wedge plate of the brake shown in FIG. 2.
Figure 4:
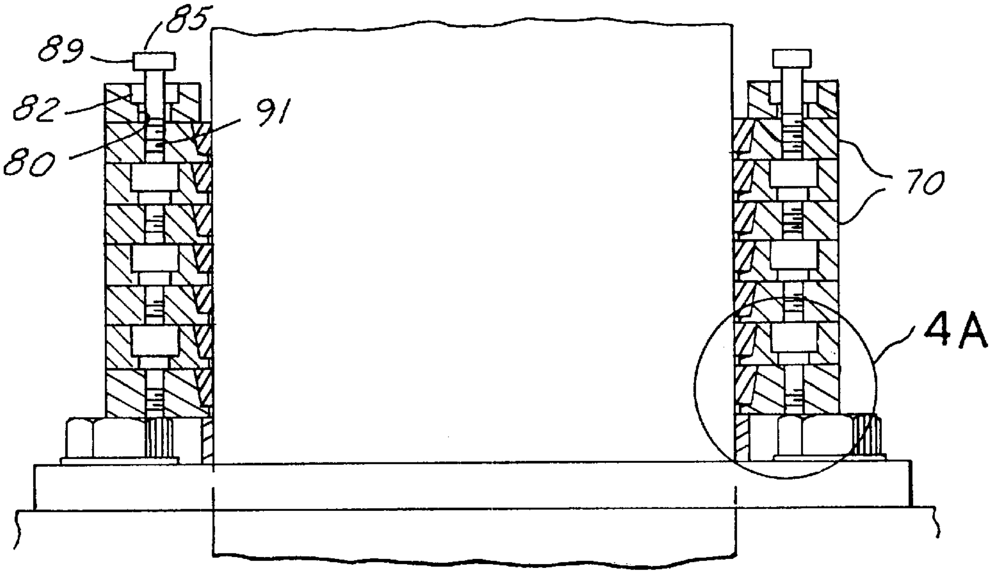
FIG. 4 is an operational view of the plugger brake shown in FIG. 3.
Figure 4A:
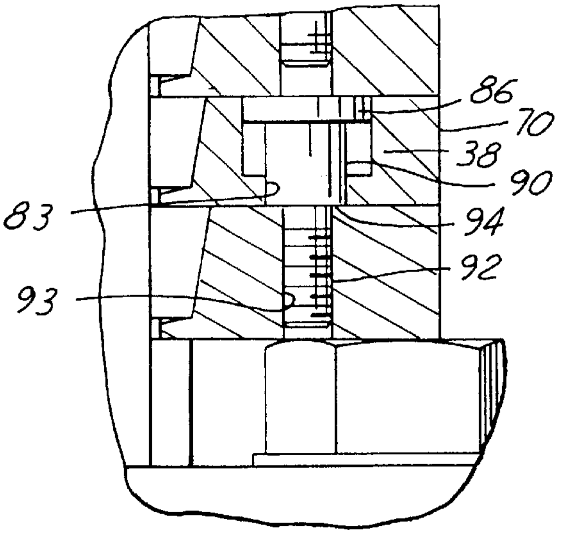
FIG. 4A is an enlarged portion of the plunger brake shown in FIG. 4.

The pressure plate 54 and wedge plates 70 have a series of apertures 80 (FIGS. 3, 4 and 4A). The apertures 80 (in the pressure plate 54 and in alternating wedge plates 70) have a counter bore 82 and enlarge bores 83. The aperture 80 in the other alternating wedge plates has a narrowed threaded section 93. The top wedge plate 70 has threadably connected thereto a top pin 85 having a head 89 with a shank 91. The shank 91 threadably mates with the threaded section 93 of the aperture 80. Positioned within the counter bore 82 of a lower wedge plate is a pin 86. The pin 86 has three sections including a head 88 (FIG. 4A), an enlarged shank 90, and a narrow shank 92. The narrow shank 92 of the pin is threadedly fixably connected with one of the wedge plates 70 with a bottom shoulder 94 of the pin being bottomed out on a top surface of the wedge plate 70. The pins 85, 86 align the lower wedge plates 70 with the pressure plate 54. The length of the enlarged shank 90 limits separation of the pressure plate 54 and the wedge plate 70 (FIG. 3) to insure minimal engagement at all times between the wedge surface 66 of the brake ring and the conical surface 72 of the wedge plate.

Figure 2:
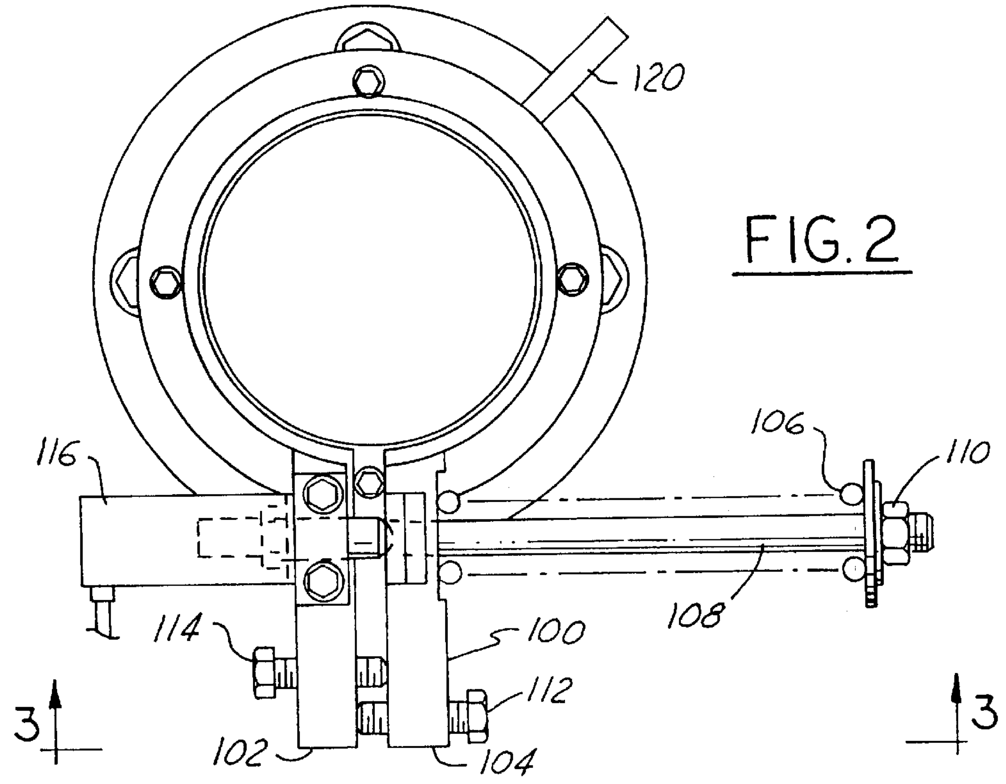
FIG. 2 is an enlarged top plan view of the inventive plunger brake according to the present invention.

The brake 52 has a split collar 100 (FIG. 2). The split collar 100 is formed by a split ring having radially outward extending arms 102, 104 connected to their ends. The collar 100 is selectively clamped with the plunger 26. The collar 100 has a horizontally mounted spring 106 to bias the collar 100 to clamp onto the plunger 26. The spring 106 is a coiled spring which has a mounting shaft 108 and nut 110 arrangement which can adjustably set the biasing force of the spring 106 to cause the collar 100 to become engaged with the plunger 26. To fine tune and adjust the desired clamping diameter of the collar 100 with the plunger 26 there are provided two opposing set screws 112, 114. The collar 100 also has a fluid actuator 116 which separates the two arms 102, 104 to allow the collar 100 to be normally unclamped with the plunger 26. In the instance shown, the fluid actuator 116 is hydraulically powered. Upon failure of the hydraulic system or optionally upon operation of a solenoid relief valve, the hydraulic fluid of the actuator 116 is released allowing the spring 106 to clamp the collar 100 onto the plunger 26. The collar is held in position by a stand (shown schematically as item 120) whose upholding force upon the collar 100 can be readily overcome. Upon clamping of the collar 100 onto the plunger 26, a subsequent downward moving plunger 26 causes the collar 100 to contact the pressure plate 54. The pressure plate 54 then moves toward the wedge plate 70. The downward movement of the pressure plate 54 forces the brake ring 60 downward to interact with the wedge surface 72 of the wedge plate 70. The brake ring 60 then circumferentially compresses the plunger surface 50 to assert a gripping hoop stress on the plunger 26. To allow for the compressive force applied on the brake ring 60, the brake ring has a radial slot 61. The grip of the brake ring 60 on the plunger 26 prevent further downward movement of the plunger 26. Furthermore, the pressure of the brake ring 60 in the downward direction causes the adjacent wedge plate 70 to act as a pressure plate for the next lower brake ring 60. The process is repeated for the lower brake rings 60. The brake 52 therefore has a self applying tendency as a plunger 26 attempts to proceed vertically downward. Each successive brake ring 60 in an almost exponential fashion applies a greater circumferential braking force upon the plunger surface 50. However, since the brake rings 60 are brass, the plunger 26 is gripped in a manner which prevents deformation or marring of its surface 50. Referring to FIG. 4A, the pin head 88 of the pressure plate now enters the, countersink 82 of the pressure plate 54 allowing the whole brake 7 to circumferentially grasp the plunger. An upward movement of the plunger 26 causes the brake ring 60 to spring back pressure plate 54 to move away from the wedge plate 70. The spring brake 60 elastically expands outward to self release from the plunger surface 50. The actuator is repressurized to unclamp (release) the collar 100 and the brake 52 is reset on the stand 120. Stand 120 may be a compliant material support on structure (not shown) in the elevator pit 12.

Figure 9:
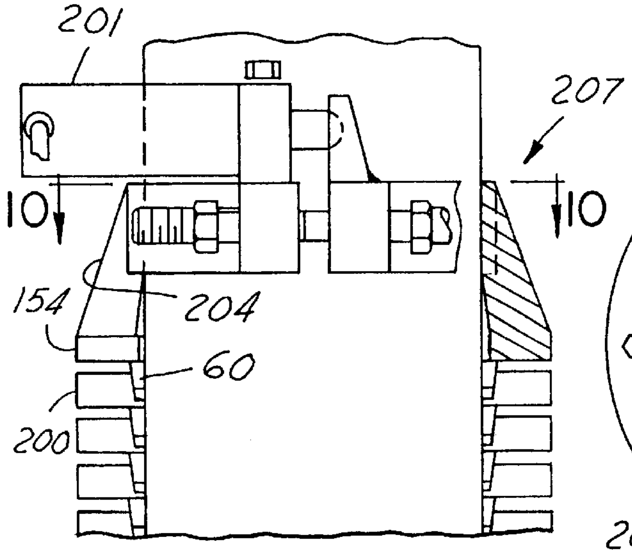
FIG. 9 is a sectional view of an alternate preferred embodiment hydraulic elevator plunger brake according to the present invention with a unitary pressure plate and collar.
Figure 10:
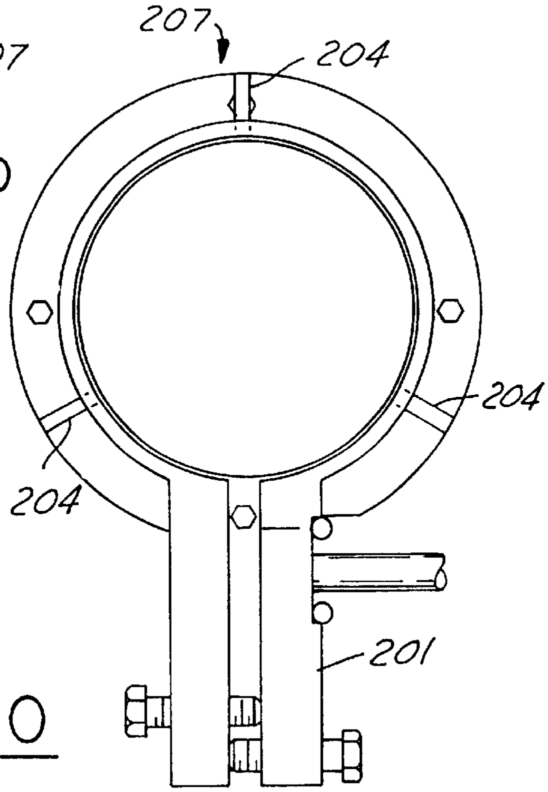
FIG. 10 is a top plan view taken on the alternate preferred embodiment hydraulic elevator plunger brake shown in FIG. 9.

FIGS. 9 and 10 illustrate an alternate preferred embodiment 207 of the present invention, wherein a collar 201 is fixably connected by three geometrically-spaced support arms 204 to a pressure plate 254. With the addition of the support arms 204, the prior described stand 120 may be eliminated. The function of the brake springs 260 and wedge plate 270, and collar 201 is essentially the same as that previously described for brake springs 60, wedge plates 70 and collar 100 and is therefore not repeated.

Figure 11:
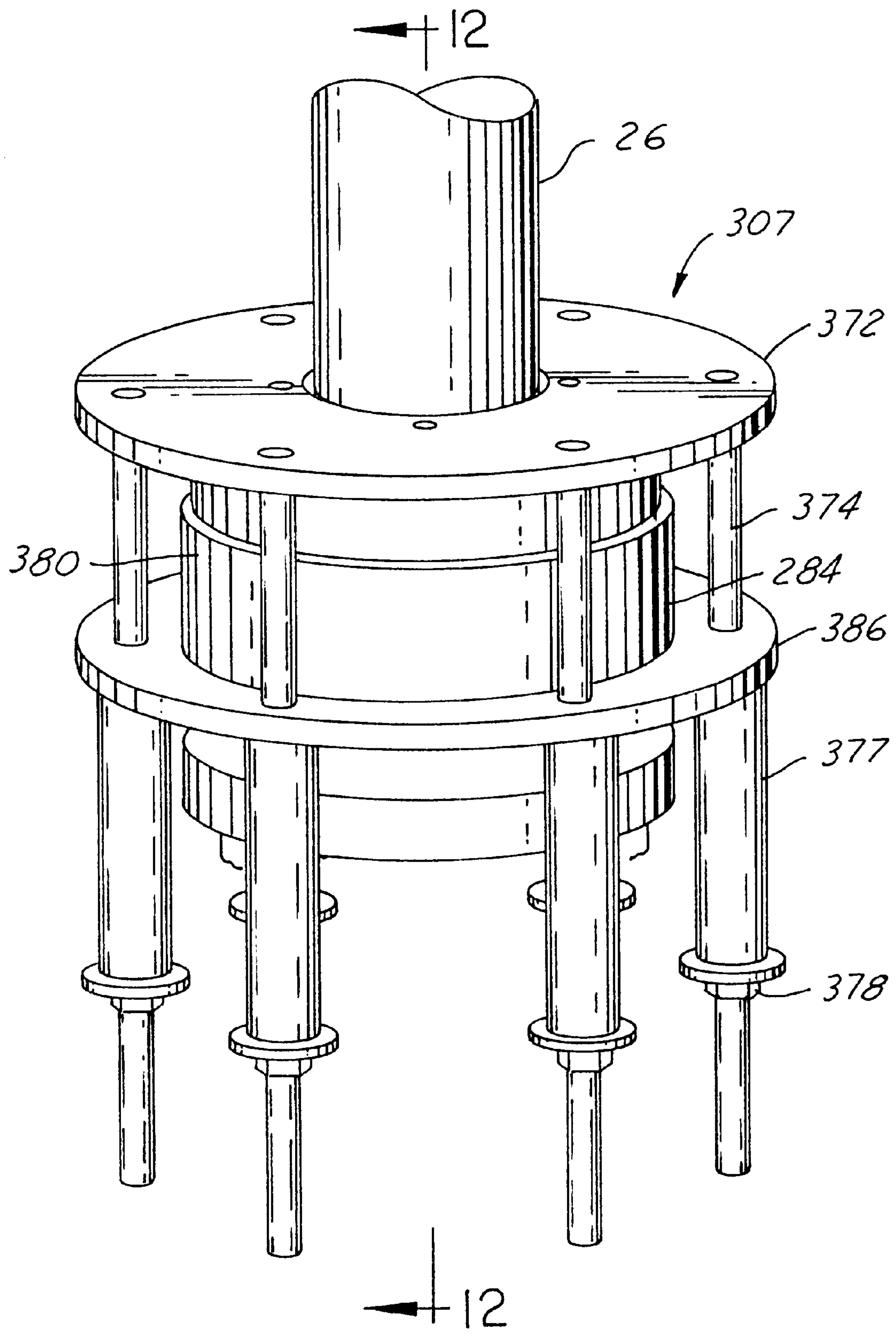
FIG. 11 is a perspective view of an alternate preferred embodiment of the hydraulic elevator plunger brake.
Figure 12:
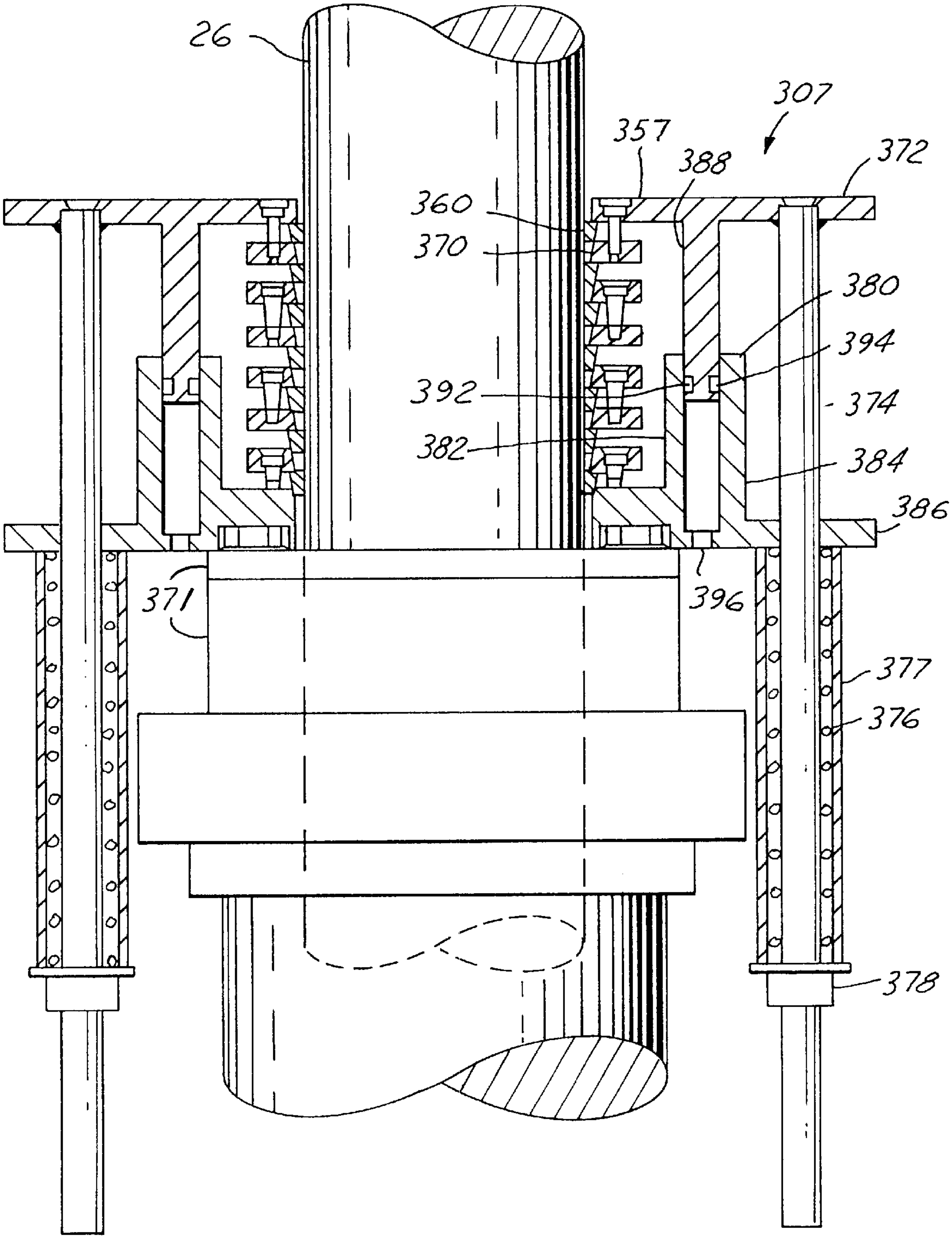
FIG. 12 is a view taken along line 12—12 of FIG. 11.

Referring to FIGS. 11 and 12, another alternate preferred embodiment plunger brake 307 is provided. The pressure plate 357, brake rings 360 and wedge plates 370 operate substantially as previously described for the pressure plate 56, brake ring 60 and wedge plate 70. The pressure plate 357 has integrally connected thereto a disc 372. Fixably connected to the disc 372 are six geometrically spaced rods 374. A bottom end of the rods 374 have a retainer 378. If desired, the retainer 378 may be threaded on the rod to allow for the adjustment of the tensioning of the coil spring 376. A vertically mounted coil spring 376 encircles each rod 374 and is captured between a bottom plate 386 and the retainer 378. The rods 374 are biased downward by the respective springs 376 to cause the plunger brake 307 to be actuated. An annular hydraulic actuator 380 is provided. The annular hydraulic actuator 380 has an outer wall or ring 384 which is joined to the bottom plate 386. The annular hydraulic actuator has an inner wall or ring 382 which is also joined to the bottom plate 386. As shown, the bottom plate 386 and rings 384, 382 are formed as one piece. A ring 388 with inner and outer seal grooves 392, 394 forms a piston for the hydraulic actuator 380. The top end of ring 388 is optionally, integrally (as shown) or weldably joined to the disc 372. Therefore the pressure plate, disc 372 and ring 388 are provided by a single piece. If desired, ring 388 can be separate member held in position by the disc 372. An interior 396 of the fluid actuator 380 is fluidly connected with the hydraulic oil line 24 (FIG. 1) to hold up the disc 372 against the force of the springs 376. Spring covers 377 prevent the fluid pressure within the actuator interior 396 from pushing out the ring 388. A fluid pressure failure, or signal of excessive speed downward of the plunger 26 will cause the fluid within the actuator 380 to be released and the springs 376 will apply the plunger brake 307 by pulling the pressure plate 357 downward. Subsequent actions of the brake rings 360 and the wedge plates 370 will be as previously described for brake rings 60 and wedge plates 70.

The design of the plunger brake 307 is very advantageous in that it has a low profile above the gland ring 371 and the springs 376 can be positioned to take advantage of the room below the gland ring 371. Additionally, the actuator 380 protects the brake rings 360 and wedge plates 370.

In an embodiment not shown, the pressure plate can be threadably connected to a support which is fixed with respect to a bottom wedge plate. The pressure plate is axially moved by an actuator that rotates the pressure plate.

In still another embodiment of the present invention, not shown, the plunger brake 52, 207, 307 is applied to a plunger of a holeless hydraulic elevator. In the holeless hydraulic elevator, the plunger is operatively connected with the elevator car via a pulley and cable arrangement. Holeless hydraulic elevators have experienced greater acceptance in Europe.

While the invention has been particularly shown and described with reference to the preferred embodiments thereof, it is well understood by those skilled in the art that various changes and modifications can be made in the invention without departing from the spirit and scope thereof.

What is claimed is:

1. A brake for a plunger of a hydraulic elevator comprising:

- a pressure plate being movable along an axis generally parallel with an axis of the plunger;
- a first brake ring encircling the plunger with an inner surface for engagement with the plunger, the first brake ring having a second surface for force engagement with the pressure plate, and the first brake ring having an outer wedge surface, and wherein the brake ring is fabricated from a metal softer than a metal which is utilized to fabricate the plunger;
- a first wedge plate, the wedge plate having a first wedge surface for engagement with the wedge surface of the first brake ring;
- a spring biasing the pressure plate and wedge plate toward one another; and
- a fluid release actuator urging the pressure plate away from the wedge plate wherein upon release of the actuator relative movement of the pressure plate towards the first wedge plate causes the brake ring to circumferentially grip the plunger and prevent movement of the plunger.

2. A brake for a plunger of a hydraulic elevator as described in claim 1, wherein the fluid release actuator is annular.

3. A brake for a plunger of a hydraulic elevator as described in claim 1, wherein the fluid release actuator circles the brake rings.

4. A brake for a plunger of a hydraulic elevator as described in claim 1, wherein the spring is mounted vertically.

5. A brake for a plunger of a hydraulic elevator as described in claim 1, with a plurality of springs.

6. A brake for a plunger of a hydraulic elevator as described in claim 1, wherein the tension of the spring is adjustable.

7. A method of braking a plunger of a hydraulic elevator comprising:

moving a pressure plate along an axis generally parallel with an axis of the plunger;

encircling the plunger with a first brake ring underneath the pressure plate, the first brake ring being fabricated from a metal softer than a metal which is utilized to fabricate the plunger, the first brake ring having an inner surface for engagement with the plunger, the brake ring having a second surface for force engagement with the pressure plate, and the first brake ring having an outer wedge surface;

engaging the wedge surface of the first brake ring with a wedge surface of a first wedge plate while the pressure plate is moving toward the first wedge plate to cause the brake ring to circumferentially engage the plunger to prevent movement of the plunger along its axis;

spring biasing the pressure plate toward the wedge plate in a normal condition; and urging the pressure plate and wedge plate away from one another with a fluid activator which is responsive to a fluid pressure in a hydraulic cylinder of the elevator.

8. A method as described in claim 7, further including:

encircling the plunger with a second brake ring similar to the first brake ring, engaging the second brake ring with a second wedge plate similar to the first wedge plate to cause the second brake ring, to circumferentially engage the plunger with a force greater than the first brake ring to prevent movement of the plunger along its axis.

9. A method of braking a plunger of a hydraulic elevator comprising:

moving a pressure plate along an axis generally parallel with an axis of the plunger;

encircling the plunger with a first brake ring underneath the pressure plate, the first brake ring being fabricated from a metal softer than a metal which is utilized to fabricate the plunger, the first brake ring having an inner surface for engagement with the plunger, the brake ring having a second surface for force engagement with the pressure plate, and the first brake ring having an outer wedge surface;

engaging the wedge surface of the first brake ring with a wedge surface of a first wedge plate while the pressure plate is moving toward the first wedge plate to cause the brake ring to circumferentially engage the plunger to prevent movement of the plunger along its axis;

spring biasing the pressure plate toward the wedge plate in a normal condition; and urging the pressure plate and wedge plate away from one another with a fluid activator which is responsive to an over speed condition of the plunger.

10. A method as described in claim 9, further including:

encircling the plunger with a second brake ring similar to the first brake ring, engaging the second brake ring with a second wedge plate similar to the first wedge plate to cause the second brake ring, to circumferentially engage the plunger with a force greater than the first brake ring to prevent movement of the plunger along its axis.

11. A brake for a plunger of a hydraulic elevator comprising:

a pressure plate being movable along an axis generally parallel with an axis of the plunger;

a first brake ring encircling the plunger with an inner surface for engagement with the plunger, the first brake ring having a second surface underneath the pressure plate for force engagement with the pressure plate, and the first brake ring having an outer wedge surface, and the first brake ring being positioned underneath the pressure plate and, wherein the brake ring is fabricated from a metal softer than a metal which is utilized to fabricate the plunger;

a first wedge plate, the wedge plate having a fist wedge surface for engagement with the wedge surface of the first brake ring;

a spring biasing the pressure plate and wedge plate toward one another; and a release actuator urging the pressure plate away from the wedge plate wherein upon release of the actuator relative movement of the pressure plate towards the first wedge plate causes the brake ring to circumferentially grip the plunger and prevent movement of the plunger.

12. A brake for a plunger of a hydraulic elevator comprising:

a pressure plate being movable along an axis generally parallel with an axis of the plunger;

a first brake ring encircling the plunger with an inner surface for engagement with the plunger, the first brake ring having a second surface for force engagement with the pressure plate, and the first brake ring having an outer wedge surface and, wherein the brake ring is fabricated from a metal softer than a metal which is utilized to fabricate the plunger;

a first wedge plate, the wedge plate having a first wedge surface for engagement with the wedge surface of the first brake ring;

a spring radially spaced outward with respect to the brake ring, the spring biasing the pressure plate and wedge plate toward one another; and a fluid release actuator urging the pressure plate away from the wedge plate wherein upon release of the actuator relative movement of the pressure plate towards the first wedge plate causes the brake ring to circumferentially grip the plunger and prevent movement of the plunger.

13. A brake for a plunger of a hydraulic elevator comprising:

a pressure plate being movable along an axis generally parallel with an axis of the plunger;

a first single slot brake ring encircling the plunger with an inner surface for engagement with the plunger, the first brake ring being fabricated from a metal softer than a metal which is utilized to fabricate the plunger, the first brake ring having a second surface for force engagement with the pressure plate, and the first brake ring having an outer wedge surface;

a first wedge plate, the wedge plate having a first wedge surface for engagement with the wedge surface of the first brake ring;

a spring biasing the pressure plate and wedge plate toward one another; and a fluid release actuator urging the pressure plate away from the wedge plate wherein upon release of the actuator relative movement of the pressure plate towards the first wedge plate causes the brake ring to circumferentially grip the plunger and prevent movement of the plunger.

* * * * *